H. ILLIG.
SCREEN.
APPLICATION FILED FEB. 16, 1915.

1,375,659.

Patented Apr. 19, 1921.

Witnesses:
Hermann Eckerlin
Kurt Bobe.

Inventor:
Heinrich Illig.

UNITED STATES PATENT OFFICE.

HEINRICH ILLIG, OF FRANKFORT-ON-THE-MAIN, GERMANY.

SCREEN.

1,375,659.

Specification of Letters Patent.

Patented Apr. 19, 1921.

Application filed February 16, 1915. Serial No. 8,706.

*To all whom it may concern:*

Be it known that I, HEINRICH ILLIG, a subject of the King of Prussia, residing at No. 12 Am Weingarten, Frankfort-on-the-Main, Germany, have invented certain new and useful Improvements in Screens, of which the following is a specification.

My invention relates to an improved screen for photo-chemical and photo-mechanical reproductions, of the kind, in which the lines of the screen are transparent and the fields between said cross-lines are deadened. The screens hitherto employed for the purpose used to be prepared either by taking a negative photographic copy by the aid of a screen having dark or deadened lines crossing each other upon a transparent surface, or by a screen having a deadened or opaque ground with transparent lines drawn upon said ground.

The screens of this kind, hitherto in use, are in a high degree liable to breaking, or the surface to being easily damaged and the deadened portions of the screen, generally, have no perfectly plane surface.

The improved screen of my invention differs from those known and employed before, in that the fields or faces between the transparent cross-lines of the screen are deepened or sunk and filled up with an opaque substance.

The accompanying drawings illustrate a screen according to this invention.

Figure 1:
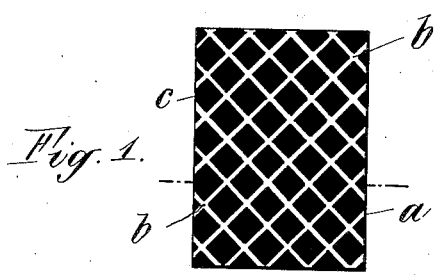

Figure 1 is a plan of the screen and

Figure 2:
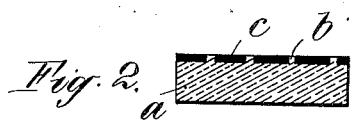

Fig. 2 a cross-section through the same.

Figure 3:
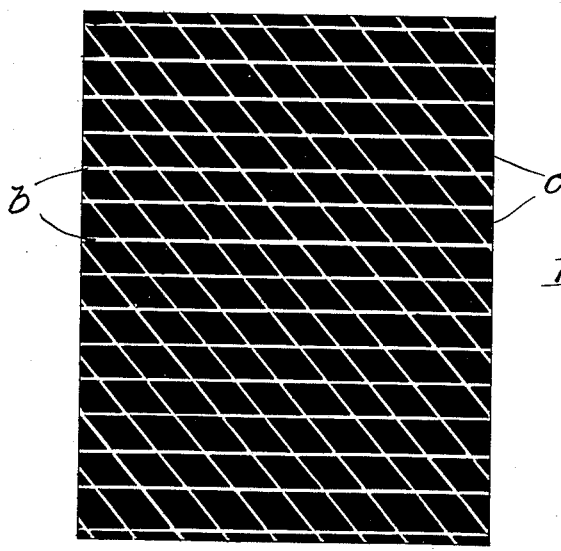

Fig. 3 is a plan of the screen showing another modification of this invention.

The screen consists of a glass-plate *a*, into the surface of which fields or recesses *c* are deepened by etching, said recessed fields, preferably, having a square shape; they are filled up with any suitable substance of an opaque kind. The cross-lines *b* which border the said fields *c* are transparent. The said transparent lines *b* may cross each other at any other angles than right angles, and in such case the said fields *c* will have the shape of a parallelogram or rhombus. This modification is illustrated in Fig. 3 of the drawing. In this modification the glass-plate is designated by *a'*, the transparent lines by *b'* and the opaque fields by *c'*.

In carrying my invention into practice, I proceed according to one or the other of the methods hereinafter more particularly described.

According to one of said methods, a net of crossing lines, destined to form the screen-netting, is printed or rolled upon the smooth surface of a transparent plate of glass, the printing ink consisting of a suitable paste resisting to the influence of acids, the print being, preferably applied by an elastic printing plate or printing roller. On spreading upon the said plate of glass a suitable etching acid, the fields between the printed lines will be deepened, while the screen-lines, protected by the print of paste, retain their original, uniform height. The deep-etched fields or recesses, then, are filled up with a suitable opaque substance to an even, uniform height flush with the lines of the screen, and the printed lines are cleared of the paste by a suitable solvent, thus leaving a transparent netting of crossing transparent lines between opaque fields.

According to another modification, I cover a flat, even plate of transparent glass with a thin coating of wax, resinous matter, asphaltum, or similar matter. Into this coating I trace the net of crossing lines, laying the surface of the glass open where the lines have been drawn or scratched. The entire surface of the plate is then covered with a solution of silver or other plating metal of the kind employed in silvering or plating looking glasses, the said solution adhering to the glass laid open in the lines of the screen, while no deposite of said solution is formed upon the portions of glass covered by the coating of wax or the like. The said coating, then, is removed by a suitable solvent, and the silvered or plated lines remain upon the glass. The squares or fields between said net of lines, thereupon, are deepened or sunk by etching the glass and the recesses thus obtained are filled up by an opaque substance. On removing the thin silver or metal coating from the lines of the screen, the said lines are transparent.

A further modification of preparing the screen consists in transferring to the transparent glass-plate the net of lines by way of photography, and then proceeding as before described.

The conspicuous advantage obtained by my invention consists in that the transparent lines of the screen are formed by the perfectly plane surface of the glass-plate itself, whereby the entire surface of the whole net of lines which form the screen is perfectly plane and its transparency unrivaled.

Owing to the fact, that the deepened squares or fields between the raised lines of the screen are filled up with an opaque substance, such as a dark, coloring mass, a great resistance of the screen is obtained against any mechanical influence. The surface of the screen-plate, accordingly, may be cleaned conveniently without the danger of impairing or damaging the plate, and if, in the course of time, the filling substance should be worn off, it may easily be replenished with the opaque substance.

I claim as my invention:

A screen for the photo-mechanical process, consisting of a sheet of transparent material having formed in one of its surfaces depressions leaving a net of transparent lines crossing each other at uniform angles, said depressions being filled with an opaque material to constitute opaque fields, said transparent lines and opaque fields being flush to form a plane surface.

In testimony whereof I affix my signature in presence of two witnesses.

HEINRICH ILLIG.

Witnesses:
HERMANN ECKERLIN,
KURT BOBE.